United States Patent Office 3,012,073
Patented Dec. 5, 1961

3,012,073
TRIFLUORO METHYLTHIOPHENYL-DICHLORO-ACET-AMIDES-1,3-PROPANEDIOL
Walter A. Gregory, Wilmington, Del., assignor to E. I. du Pont de Nemours and Company, Wilmington, Del., a corporation of Delaware
No Drawing. Filed Apr. 11, 1960, Ser. No. 21,113
1 Claim. (Cl. 260—562)

This invention relates to the novel compound 1-(p-trifluoromethylthiophenyl) - 2- (alpha,alpha - dichloroacetamido)-1,3-propanediol and to its preparation.

The compound of this invention is represented by the formula:

(1) 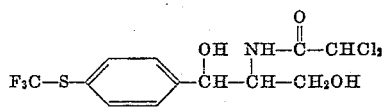

The compound of Formula 1 can be prepared by several reaction routes. A preferred method of producing this compound is illustrated by the following series of reactions:

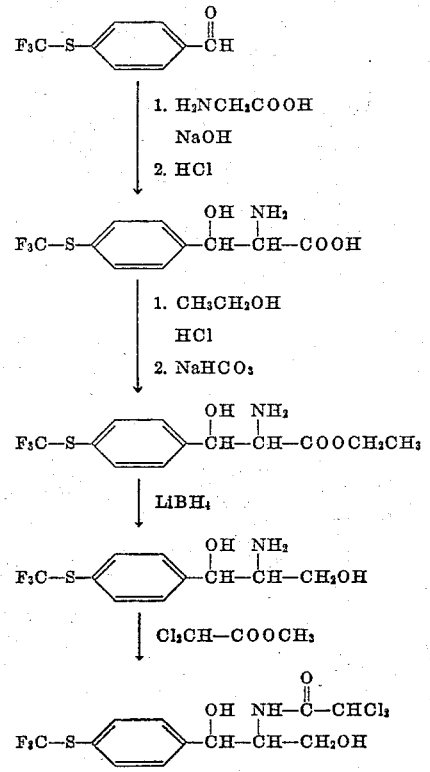

The preparation of p - trifluoromethylthiobenzaldehyde, the starting material for the above reaction series, is described in my copending application with James B. Buchanan, Serial No. 788,499 filed January 23, 1959. Briefly, as disclosed in said application, the preparation of p-trifluoromethylthiobenzaldehyde proceeds from the known compound p-(methylthio)-benzaldehyde which is chlorinated by such an agent as phosphorus pentachloride or thionyl chloride to yield alpha,alpha-dichloro-p-tolyl trichloromethyl sulfide, which in turn is reacted with three equivalents or slightly more of hydrogen fluoride in a pressure vessel at an elevated temperature of, say, 80° to 200° C., to form the trifluoromethylthio derivative, which is then readily converted to the desired p-trifluoromethylthiobenzaldehyde by reaction with sulfuric acid at a temperature of, say, from 20° to 50° C.

In preparing the compound of this invention, the condensation of p-trifluoromethylthiobenzaldehyde with glycine is carried out in a suitable medium in the presence of an organic or inorganic base. The reaction can be conveniently carried out at room temperature or slightly below. The product of the reaction is largely the threo form of 3-(p-trifluoromethylthiophenyl)serine, which product is readily isolated in a satisfactory state of purity. If desired, however, this product can be further purified by separation from the small amount of erythro form present by selective precipitation of the copper complex of the threo form. The copper complex of the erythro form remains in solution and is completely separated by filtration. The threo - 3 - (p-trifluoromethylthiophenyl)serine is liberated from the insoluble copper complex by agents such as hydrogen sulfide, ethylenediamine-tetraacetic acid, triethylene tetramine, etc.

The esterification of threo-3-(p-trifluoromethylthiophenyl)serine is carried out by suspending the compound in a suitable anhydrous alkanol, such as ethanol or methanol, and passing dry hydrogen chloride into the stirred reaction medium. Removal of the solvent yields the alkyl ester hydrochloride of threo-3-(p-trifluoromethylthiophenyl)serine. When the amine hydrochloride is dissolved in water and a basic material is added, the relatively water-insoluble free alkyl ester of threo-3-(p-trifluoromethylthiophenyl)serine crystallizes out and is readily isolated.

Reduction of the threo-3-(p-trifluoromethylthiophenyl)-serine, alkyl ester, to threo - 1 - (p-trifluoromethylthiophenyl)-2-amino-1,3-propanediol is carried out by reaction with one of a number of alkali metal borohydrides or aluminohydrides in the suitable organic solvent. The final dichloroacetylation step is carried out by heating the threo - 1 - (p-trifluoromethylthiophenyl)-2-amino-1,3-propanediol with an alkyl ester of dichloroacetic acid, preferably the methyl or ethyl ester, whereby the product of Formula 1 is obtained. The product, dl - threo-1-(p-trifluoromethylthiophenyl) - 2 dichloroacetamido-1,3-propanediol, can be purified by recrystallization from a number of solvents; nitromethane is especially suitable.

The compound of the present invention can also be prepared by the following series of reactions, also starting from p-trifluoromethylthiobenzaldehyde:

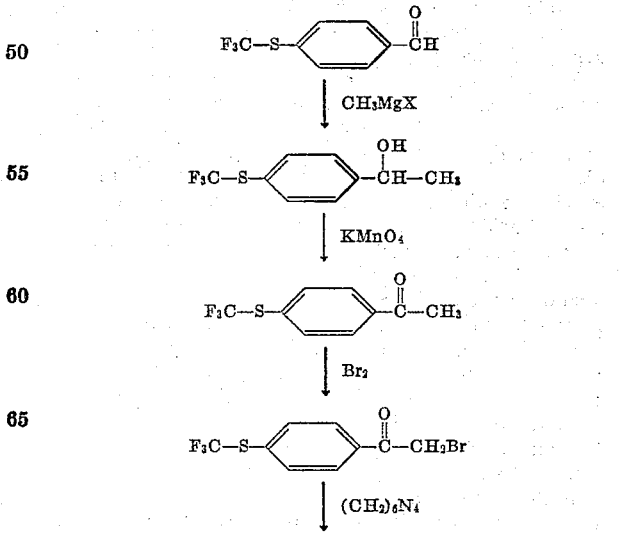

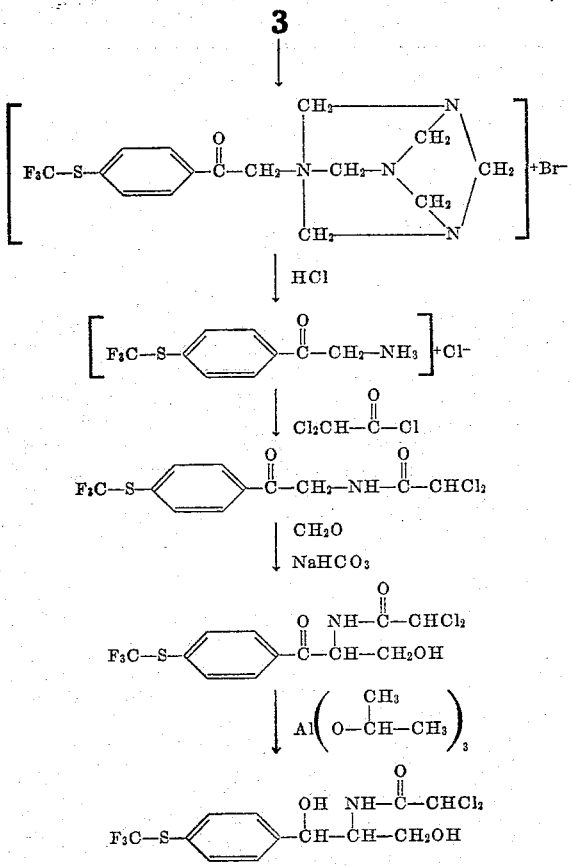

The preparation of 1-(p-trifluoromethylthiophenyl)ethanol is carried out by reacting p-trifluoromethylthiobenzaldehyde with a methyl Grignard reagent in a suitable solvent. The secondary alcohol so formed is oxidized to the corresponding p-trifluoromethylthioacetophenone by a ketone-metal alkoxide agent or other suitable oxidizing agent, such as potassium permanganate. p-Trifluoromethylthiophenacyl bromide is obtained by the action of elemental bromine on p-trifluoromethylthioacetophenone in a suitable solvent system. The reaction is preferably carried out at room temperature or slightly below.

Reaction of p-trifluoromethylthiophenacyl bromide in an inert solvent with hexamethylenetetramine yields the corresponding quaternary salt, which is decomposed by the action of hydrogen chloride in a suitable medium to yield p-(alpha-aminoacetyl)phenyl trifluoromethyl sulfide hydrochloride. When a suspension of this hydrochloride is stirred and heated with dichloroacetyl chloride, alpha,alpha - dichloro-N-(p-trifluoromethylthiophenacyl)acetamide is formed.

Hydroxymethylation of the acetamide can be accomplished by stirring this material in an aqueous alcohol or other suitable medium with formaldehyde and a weakly basic catalytic material. The product is alpha,alpha-dichloro - N-[2-hydroxy-1-(p-trifluoromethylthiobenzoyl) ethyl] acetamide. The latter is reduced with an aluminum alkoxide in a suitable secondary alcohol at an elevated temperature to yield the product of this invention.

It will be understood that the compound of this invention can exist in optical isomeric forms. The stereoisomeric terms as used herein refer to the spatial arrangement of the polar groups on the two asymmetric carbon atoms with reference to the structures of threose and erythrose. To differentiate between these two forms, the diastereoisomeric pair related to threose in configuration has been designated as the threo form, and the diastereoisomeric pair related to erythrose as the erythro form.

Both the threo and erythro forms can exist as racemic modifications or mixtures of optically active dextro and levo rotatory isomers as well as in the form of the individual or separated dextro and levo forms. In view of the difficulty of representing the various optical isomers with plane formulae, the customary structural formulae have been used. It will be further understood that where no rotation appears with a formula or with a chemical name, the formula or name is to be interpreted in its generic sense, that is, as representing the dextro or levo threo isomers in separated form, as well as in the dl-threo racemic modification or optically inactive mixture. In other words, a formula or name represents not only the unresolved mixture of isomers but also the individual isomers.

The compound of this invention has valuable and useful pharmacological properties. It is particularly useful as an antibacterial agent. For example, it inhibits the growth of the microorganism Micrococcus pyogenes, var. aureus.

This invention will be better understood but is not intended to be limited by the following example illustrating the preparation of dl - threo - 1-(p-trifluoromethylthiophenyl) - 2 - (alpha,alpha-dichloroacetamido) - 1,3-propanediol:

A solution of 7.5 g. of glycine in 20 cc. of water is stirred in a nitrogen atmosphere while a solution of 42 g. of p-(trifluoromethylthio)benzaldehyde in 75 cc. of ethyl alcohol is added. A 15% solution of sodium hydroxide in water is then added dropwise, keeping the temperature at 10–15° C. The pH of the solution is raised to 8.5 and a pale yellow color develops. The solution is stirred at this temperature for 1.5 hours and then the pH is raised to 9.5. A total of 4.5 g. of sodium hydroxide is required.

The resulting solution is allowed to stand 23 hours during which time a bright yellow color develops. The alcohol is then distilled off under reduced pressure and 100 cc. of water added, followed by 100 cc. of conc. hydrochloric acid. The yellow color fades and an oily layer separates. The oil is extracted with carbon tetrachloride. Concentration of the extract yields 22 g. of residue, which is mainly p-(trifluoromethylthio)benzaldehyde.

The aqueous layer is stirred and neutralized by adding 20% aqueous sodium hydroxide. White crystals separate and these are filtered and washed with water to yield 22 g. of product, melting point, 157–159° (dec.). This material is almost pure threo-3-(p-trifluoromethylthiophenyl)serine.

A stream of hydrogen chloride is passed into a stirred suspension of 22 g. of threo-3-(p-trifluoromethylthiophenyl)serine in 200 cc. of absolute ethanol until the mixture is saturated. The temperature is kept below 70° C. After standing one hour, the resulting solution is sparged with nitrogen, the solvent is distilled off and the gummy residue is dissolved in ether. Addition of benzene causes crystals to separate. The product is filtered and washed with benzene to yield the ester hydrochloride as a white crystalline solid, melting with decomposition at 135° to 140° C.

The hydrochloride is dissolved in 40 cc. of water and a saturated solution of sodium bicarbonate is added until the solution is neutral. The ester separates as white crystals melting at 112° to 116° C. The product may be purified by dissolving it in cold tetrahydrofuran and adding cyclohexane to the solution. The purified material obtained is the ethyl ester of threo-3-(p-trifluoromethylthiophenyl)serine, melting point 121° to 122° C.

A solution of 3.72 g. of the ethyl ester of 3-(p-trifluoromethylthiophenyl)serine and 0.4 g. of lithium borohydride in tetrahydrofuran is refluxed two hours. At this time, 0.4 g. more lithium borohydride is added and the refluxing is continued for a further 3.5 hours. The solution is then diluted with 50 cc. of water and acidified by adding conc. hydrochloric acid. The tetrahydrofuran is distilled off under reduced pressure and the residual aqueous solution passed over a column of sulfonated polystyrene resin (Dowex 50) on the acid cycle upon which the product is adsorbed. The column is washed until it is free from acid, and then eluted with 14% ammonium hydroxide. Concentration of the eluate yields crude threo - 1 - (p - trifluoromethylthiophenyl) - 2-amino-1,3-propanediol as a partly crystalline residue. This material is used without purification for the next step. It is taken up in 50 cc. of methanol, 10 cc. of methyl dichloroacetate is added, and the solution is refluxed for three hours, following which the solvent is removed under reduced pressure. The residue is crystallized from nitromethane to yield *dl*-threo-1-(p-trifluoromethylthiophenyl)-2-(alpha, alpha - dichloroacetamido)-1,3-propanediol, as white needles, melting at 141° to 142° C.

A most important use for the novel compound of this invention is its outstanding value as an intermediate in the preparation of 1-(p-trifluoromethylsulfonylphenyl)-2-(alpha, alpha-dichloroacetamido)-1,3-propanediol, a known therapeutic compound. The compound of this invention can be readily converted to 1-(p-trifluoromethylsulfonylphenyl)-2-(alpha, alpha-dichloroacetamido)-1,3-propanediol by oxidation with a suitable oxidizing agent, such as peracetic acid, in a suitable medium, such as methylene chloride or acetic acid. A somewhat longer time for complete reaction is required if the medium is acetic acid.

The simplicity and practicality of this utility for the compound of this invention renders it unique and valuable. This utility is illustrated by the following detailed example:

*Conversion of 1-(p-trifluoromethylthiophenyl)-2-(alpha, alpha-dichloroacetamido)-1,3-propanediol into 1-(p-trifluoromethylsulfonylphenyl) - 2 - (alpha, alpha - dichloroacetamido)-1,3-propanediol*

A solution of 6 milliliters of 40% peracetic acid in 10 milliliters of methylene chloride was dried by agitation with 2 grams of anhydrous sodium acetate and 5 grams of anhydrous magnesium sulfate. After the drying agents were removed by filtration, 3 milliliters of the solution was treated, while being stirred, with 0.5 gram of anhydrous sodium acetate followed by 0.25 gram of 1-(p-trifluoromethylthiophenyl) - 2 - (alpha, alpha - dichloroacetamido)-1,3-propanediol. The resulting mixture was stirred at ordinary temperatures for about 24 hours, then poured into water. Sodium bicarbonate was added until the aqueous mixture was neutral and the methylene chloride was removed by passing a stream of nitrogen through the mixture. The white crystals which separated were collected by filtration, washed with water, and air dried. Thus was obtained 0.13 gram of 1-(p-trifluoromethylsulfonylphenyl) - 2 - (alpha, alpha - dichloroacetamido)-1,3-propanediol, M.P. 157–158° C. It was recrystallized from acetonitrile-ethylene chloride to give 0.09 gram, M.P. 165–167° C. A mixed melting point with a sample of the compound prepared by an alternate method showed no depression and infra-red spectroscopy further confirmed the structure.

This application is a continuation-in-part of my copending application Serial No. 802,294 filed March 27, 1959, now abandoned.

The invention claimed is:

1 - (p - Trifluoromethylthiophenyl) - 2 - (alpha, alpha-dichloroacetamido)-1,3-propanediol.

References Cited in the file of this patent

UNITED STATES PATENTS

| | | |
|---|---|---|
| 2,721,207 | Bambas | Nov. 1, 1952 |
| 2,742,500 | Gregory | Apr. 17, 1956 |
| 2,763,692 | Gregory | Sept. 18, 1956 |
| 2,816,915 | Gregory | Dec. 17, 1957 |

FOREIGN PATENTS

| | | |
|---|---|---|
| 165,769 | Australia | Oct. 1, 1953 |